(12) United States Patent
Tseng

(10) Patent No.: US 9,423,573 B2
(45) Date of Patent: Aug. 23, 2016

(54) OPTICAL FIBER SOCKET

(71) Applicant: Emit Technology Co., Ltd., New Taipei (TW)

(72) Inventor: Fan-Chen Tseng, New Taipei (TW)

(73) Assignee: EMIT TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/580,520

(22) Filed: Dec. 23, 2014

(65) Prior Publication Data

US 2016/0178855 A1    Jun. 23, 2016

(51) Int. Cl.
*G02B 6/38* (2006.01)

(52) U.S. Cl.
CPC ............ *G02B 6/3893* (2013.01); *G02B 6/3825* (2013.01); *G02B 6/3879* (2013.01)

(58) Field of Classification Search
CPC .... G02B 6/3825; G02B 6/387; G02B 6/3879; G02B 6/3881; G02B 6/389; G02B 6/3893
See application file for complete search history.

(56) References Cited

U.S. PATENT DOCUMENTS

| | | | | |
|---|---|---|---|---|
| 6,027,252 A * | 2/2000 | Erdman | ............... | G02B 6/3825 385/53 |
| 6,130,983 A * | 10/2000 | Cheng | ................. | G02B 6/3829 385/136 |
| 6,623,172 B1 * | 9/2003 | de Jong | ................ | G02B 6/3806 385/59 |
| 6,953,285 B2 * | 10/2005 | Mickievicz | .......... | G02B 6/3878 385/53 |
| 7,384,200 B2 * | 6/2008 | Nakagawa | ........... | G02B 6/3825 248/27.1 |
| 8,757,896 B2 * | 6/2014 | Wang | ................ | B29C 45/14065 29/428 |
| 8,926,193 B2 * | 1/2015 | Kim | ..................... | G02B 6/3849 385/77 |
| 2004/0062487 A1 * | 4/2004 | Mickievicz | .......... | G02B 6/3878 385/56 |
| 2007/0165984 A1 * | 7/2007 | Nakagawa | ........... | G02B 6/3897 385/55 |
| 2013/0121646 A1 * | 5/2013 | Kim | ..................... | G02B 6/3849 385/77 |
| 2013/0163937 A1 * | 6/2013 | Wang | ................ | B29C 45/14065 385/89 |

* cited by examiner

*Primary Examiner* — Rhonda Peace
(74) *Attorney, Agent, or Firm* — Chun-Ming Shih; HDLS IPR Services

(57) ABSTRACT

An optical fiber socket includes a socket body and a fastening member. The socket body has a plugging slot. The edge of the plugging slot forms a stop wall and an accommodating slot is formed in the plugging slot near the stop wall. The fastening member is slidably disposed in the plugging slot. The fastening member extends and forms a stopper pin. The stopper pin is for sliding along the accommodating slot and for being stopped between the stop wall and the accommodating slot. The stopper pin stops between the stop wall and the accommodating slot so the optical fiber plug is able to be plugged in and be fixed stably.

10 Claims, 6 Drawing Sheets

OPTICAL FIBER SOCKET

TECHNICAL FIELD

The disclosure relates to an optical fiber connector, more particularly to an optical fiber socket having a mechanism for fixing a plug.

BACKGROUND

Nowadays the Internet is common and the amount of network traffic is increasing. The optical fiber is gradually replacing the traditional metal wires and becomes the mainstream of the internet data transmission wire. In addition to the amount and speed of data transmission, the stability of data transmission is also very important. The fixed wire is usually stable and reliable but the connector connected to the wire may cause problems. Specifically, the connector is pluggable so it may cause instability in transmission if the connector is not properly fixed.

The objective of the disclosure is to provide an improved design capable of solving the problems mentioned above

SUMMARY

The disclosure provides an optical fiber socket with a fixing mechanism.

An optical fiber socket comprises a socket body and a fastening member. The socket body has a plugging slot. The edge of the plugging slot forms a stop wall and an accommodating slot is formed in the plugging slot near the stop wall. The fastening member is slidably disposed in the plugging slot. The fastening member extends and forms a stopper pin. The stopper pin is for sliding along the accommodating slot and for being stopped between the stop wall and the accommodating slot.

In one embodiment, a pair of accommodating slots is disposed on two sides of the stop wall. The fastening member extends and forms a pair of stopper pins corresponding to each of the accommodating slots. Each of the stopper pins is configured for sliding along the accommodating slot and for being stopped between the stop wall and the accommodating slot. The vertical direction of the accommodating slot and the vertical direction of the plugging slot are parallel to each other. A lateral opening connecting the plugging slot is formed on the socket body. The fastening member has a paddle. The paddle is in and exposed by the lateral opening and is configured for sliding along the lateral opening. The fastening member extends and forms a locating sheet. A locating block corresponding to the locating sheet is disposed on and protrudes from the plugging slot. The fastening member is configured for moving in order to make the locating sheet press the locating block. When the locating sheet fixes the fastening member, the stopper pin exits from the place between the stop wall and the accommodating slot.

In one embodiment, the socket body has a plurality of plugging slots while a plurality of lateral openings connecting each of the plugging slots are formed on the socket body. The number of the fastening members is plural. Each of the fastening members is disposed in the corresponding plugging slot. Each of the fastening members has a paddle. Each of the paddles is in and exposed by the corresponding lateral opening and is configured for sliding along the lateral opening. The optical fiber socket may further comprise a connecting plate. Each of the paddles extends and forms a flange connected to the connecting plate.

By the accommodating slot, an optical fiber plug may be plugged in and unplugged from the optical fiber socket of the disclosure easily. Additionally, the stopper pin stops between the stop wall and the accommodating slot so the optical fiber plug is fixed stably, thereby improving its safety

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Figure 1:
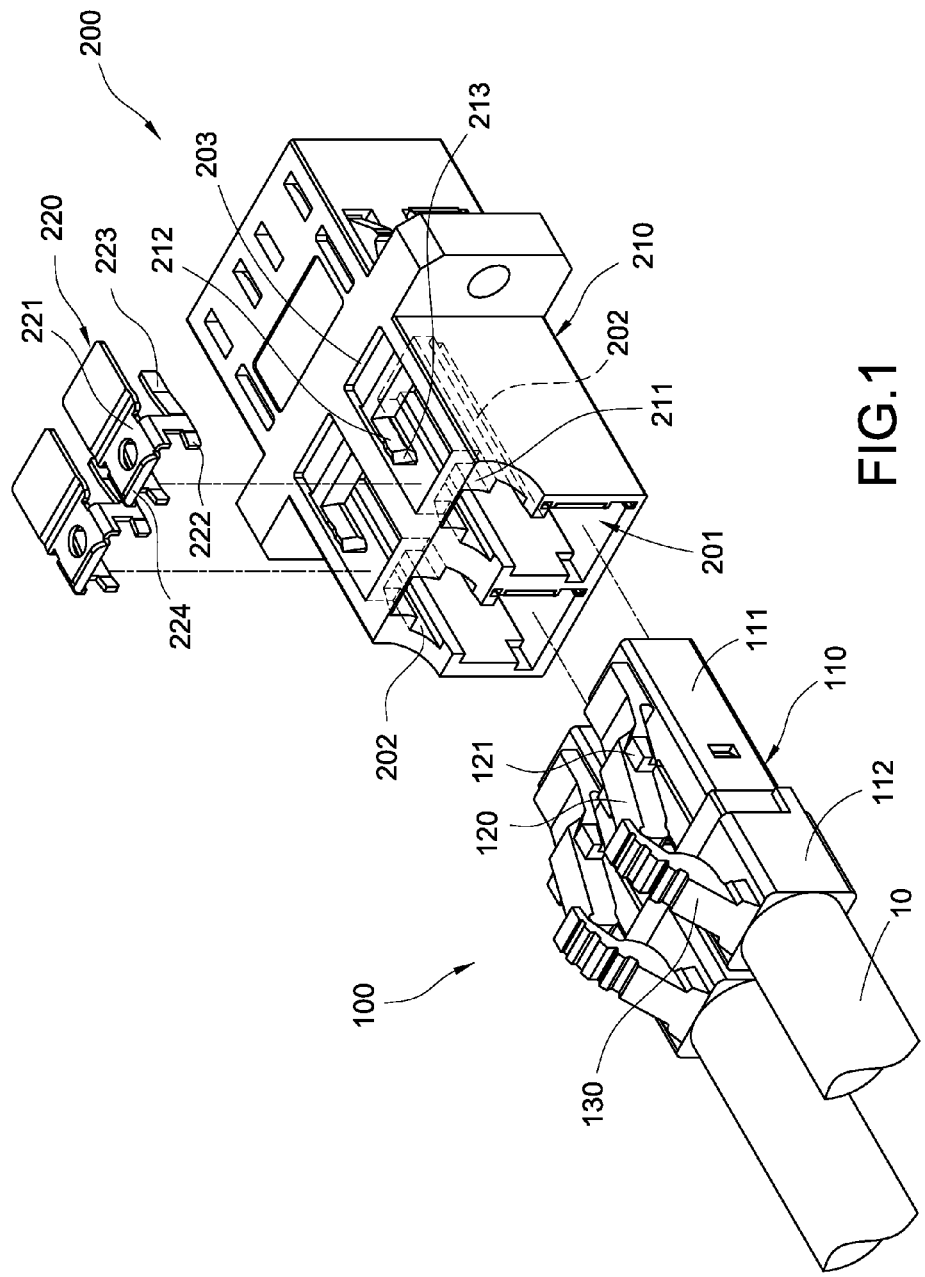
FIG. 1 is an exploded view of an optical fiber socket according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
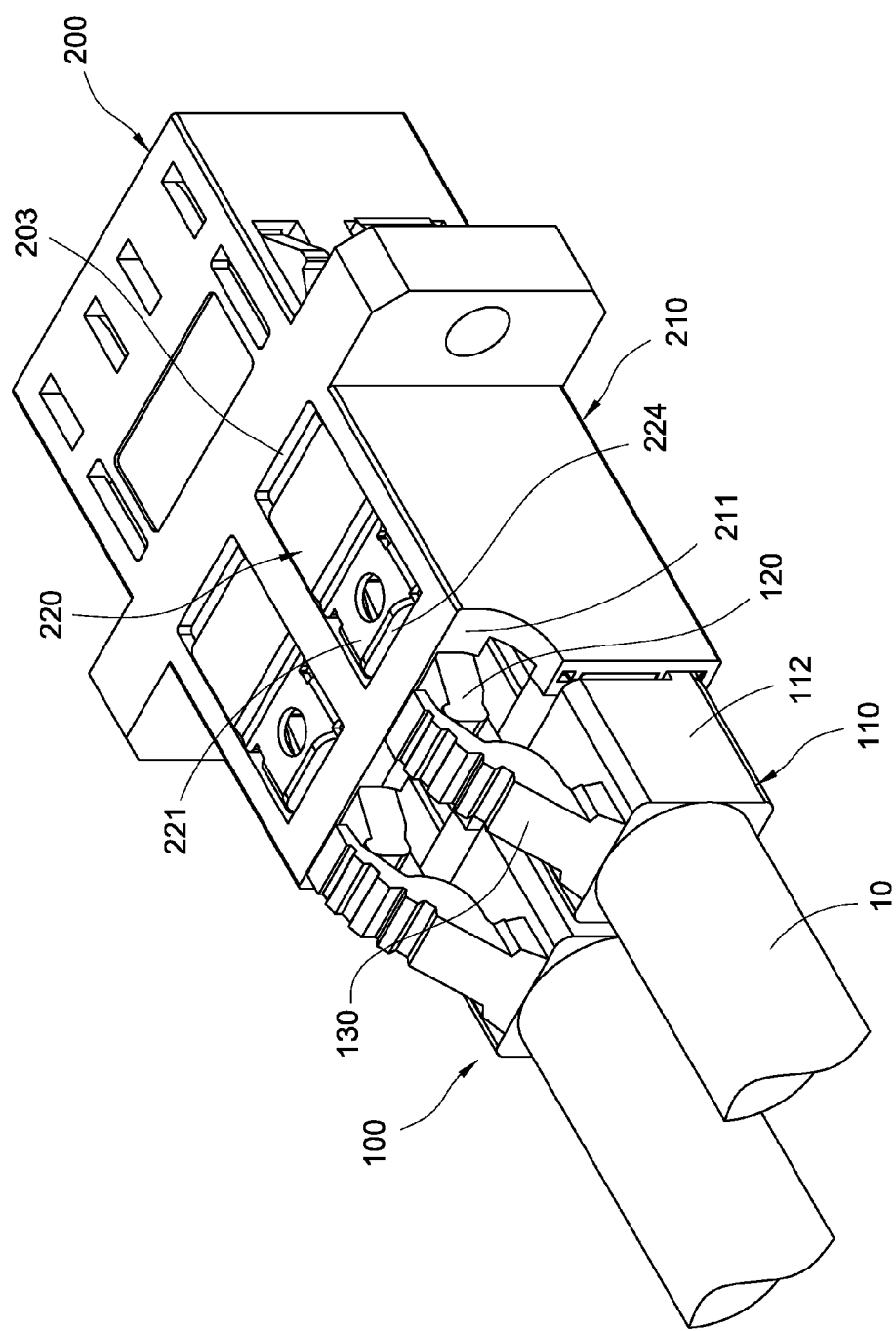
FIG. 2 is a perspective view of the optical fiber socket connected to an optical fiber plug according to the embodiment of the disclosure.

Referring to FIG. 1 and FIG. 2, the disclosure provides an optical fiber socket 200 for an optical fiber plug 100 to be plugged in.

In this embodiment, the optical fiber plug 100 comprises a plug body 110, a snap-fit elastic arm 120 and a pressing elastic arm 130.

The plug body 110 is preferably to be a rectangular cylinder made of plastic. It is made by a plugging section 111 and a wire section 112 connected together. An optical fiber wire 10 is connected to one end of the wire section 112 while the plugging section 111 is configured for being plugged into the optical fiber socket 200.

The snap-fit elastic arm 120 is preferably to be formed on the plug body 110. One end of the snap-fit elastic arm 120 is connected to the lateral side of the plugging section 111 of the plug body 110. The snap-fit elastic arm 120 is arranged on this lateral side at an angle. A stop block 121 is disposed on and protrudes from the snap-fit elastic arm 120. In this embodiment, a pair of stop blocks 121 is disposed on and protrudes from two sides of the snap-fit elastic arm 120, but the disclosure is not limited thereto.

The pressing elastic arm 130 is arranged on the lateral side of the plug body 110 at an angle. In this embodiment, one end of the pressing elastic arm 130 is connected to the lateral side of the plugging section 112 of the plug body 110. The snap-fit elastic arm 120 and the pressing elastic arm 130 are connected to two ends of the plug body 110 respectively and the snap-fit elastic arm 120 and the pressing elastic arm 130 are arranged correspondingly. Another end of the pressing elastic arm 130 extends and in contact with another end of the snap-fit elastic arm and presses it, preferably. Thereby, when the pressing elastic arm 130 is pressed, the snap-fit elastic arm 120 is also being pressed.

In this embodiment, the optical fiber socket 200 comprises a socket body 210 and at least one fastening member 220.

The socket body 210 has at least one plugging slot 201. In this embodiment, the socket body 210 has two plugging slots 201 arranged in parallel for two optical fiber plugs 100 to be plugged in, but the disclosure is not limited thereto. Preferably, the shape of each plugging slots 201 is like a rectangular opening corresponding to the socket body 110 of the optical fiber socket. One side of the edge of each plugging slot 201 forms a stop wall 211. A pair of accommodating slots 202 corresponding to each other is formed in the plugging slot 201. The vertical direction of each accommodating slot 202 is parallel to the vertical direction of each plugging slot 201. One end of each accommodating slot 202 is arranged near the stop wall 211. At least one locating block 212 is disposed in and protrudes from each plugging slot 201 and each locating block 212 has a guide slope 213. A plurality of lateral openings 203 connecting one side of each plugging slot 201 is formed on the socket body 210.

In this embodiment, the optical fiber socket 200 preferably comprises a plurality of fastening members 220. One fastening member 220 is arranged in each plugging slot 201 and the fastening members 220 are slidably disposed in the plugging slots 201. Each fastening member 220 comprises a paddle 221 which is in and exposed by the corresponding lateral opening 203. The paddle 221 is configured for sliding along the lateral opening 203. Each paddle 221 extends and forms a stopper pin 222 corresponding to each stop bock 121 of the optical fiber plug 100. In this embodiment, two sides of each paddle 221 extend and form a pair of stopper pins 222 opposite to each other, but the disclosure is not limited thereto. Each paddle 221 extends and forms a locating sheet 223 corresponding to each locating block 212. Moving the paddle 221 may drive the stopper pin 222 and the locating sheet 223 to move along the accommodating slot 202.

The stopper pin 222 may make the accommodating slot 202 slide and be stopped between the stop wall 211 and the accommodating slot 202. The locating sheet 223 may move to press the locating block 212 and the locating sheet 223 is guided to cross the locating block 212 by the guide slope 213 in the moving process. The fastening member 220 is fixed by the reaction force of the locating sheet 223 pressing the locating block 212. In this embodiment, the stopper pin 222 exits from the place between the stop wall 211 and the accommodating slot 202 while the locating sheet 223 is fixing the fastening member 220, but the disclosure is not limited thereto.

Figure 3:
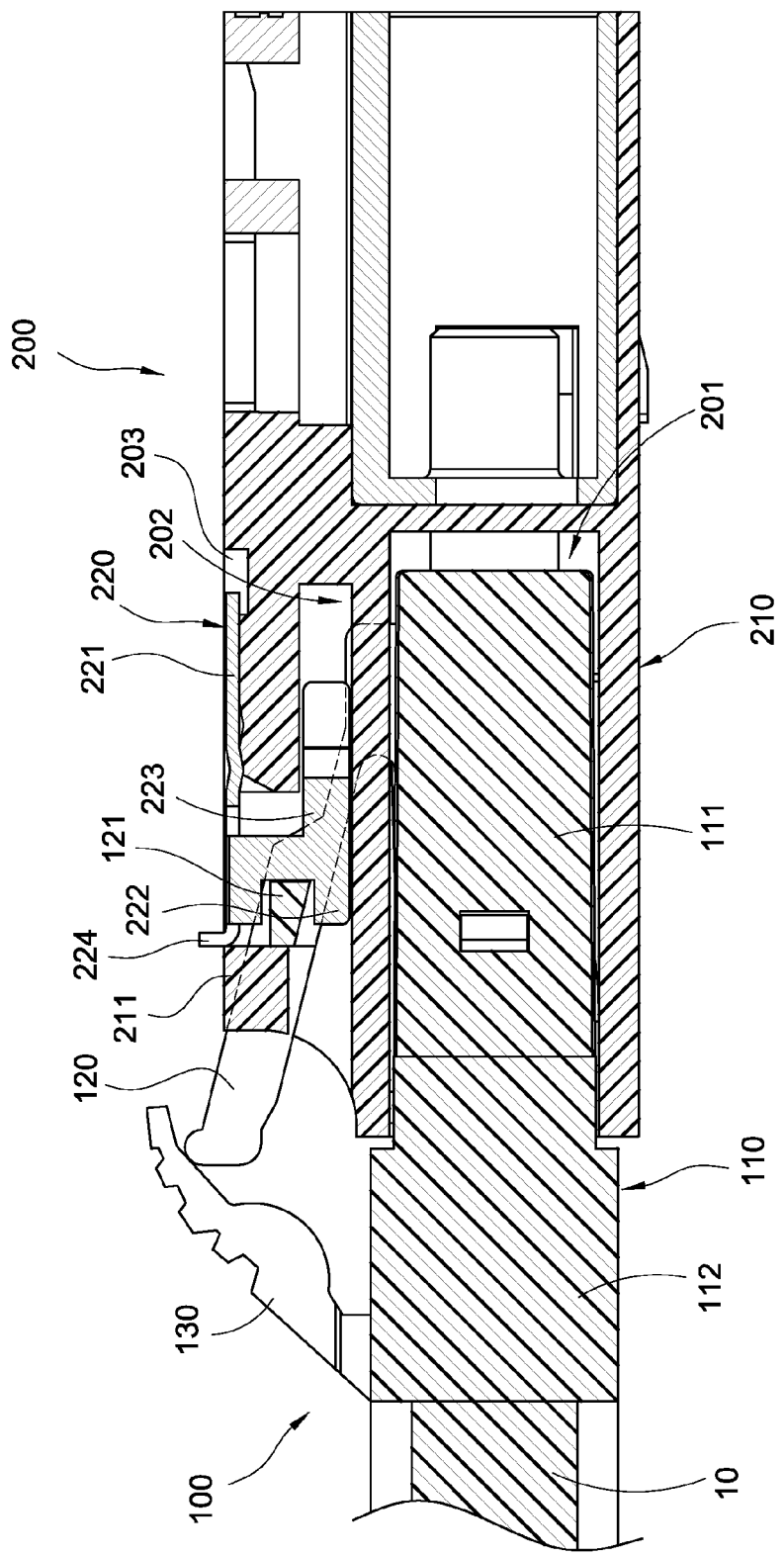
FIG. 3 is a sectional view of the optical fiber socket connected to the optical fiber plug according to the embodiment of the disclosure.

As seen in FIG. 3, the plugging section 111 of the plug body 110 is plugged into the plugging slot 201 when the optical fiber plug 110 is plugged in the optical fiber socket 200. This makes the outer edge of the stop wall 211 touch the snap-fit elastic arm 120 on the plugging section 111. Since the snap-fit elastic arm 120 is arranged at an angle, the stop wall 211 may press the snap-fit elastic arm 120 when the plugging section 111 continues to enter into the plugging slot 201. Thereby, the stop block 121 on the snap-fit elastic arm 120 is moved to a place corresponding to the accommodating slot 202 so it is able to move into the accommodating slot 202. When the plugging section 111 continues to enter into the plugging slot 201 (which makes the stop block 121 pass through the stop wall 211 completely), the snap-fit elastic arm 120 bounces back and makes the stop block 121 stop at an inner edge of one side of the stop wall 211. Thereby, the optical fiber plug 100 and the optical fiber socket 200 are fastened with each other. Push the paddle 221 via the lateral opening 203 to make the stopper pin 222 stop between the stop wall 211 and the accommodating slot 202 and this can make the stop block 121 exit from the accommodating slot 202. Thereby, this avoids the snap-fit elastic arm 120 being inadvertently touched which causes the optical fiber plug 100 to release.

Figure 4:
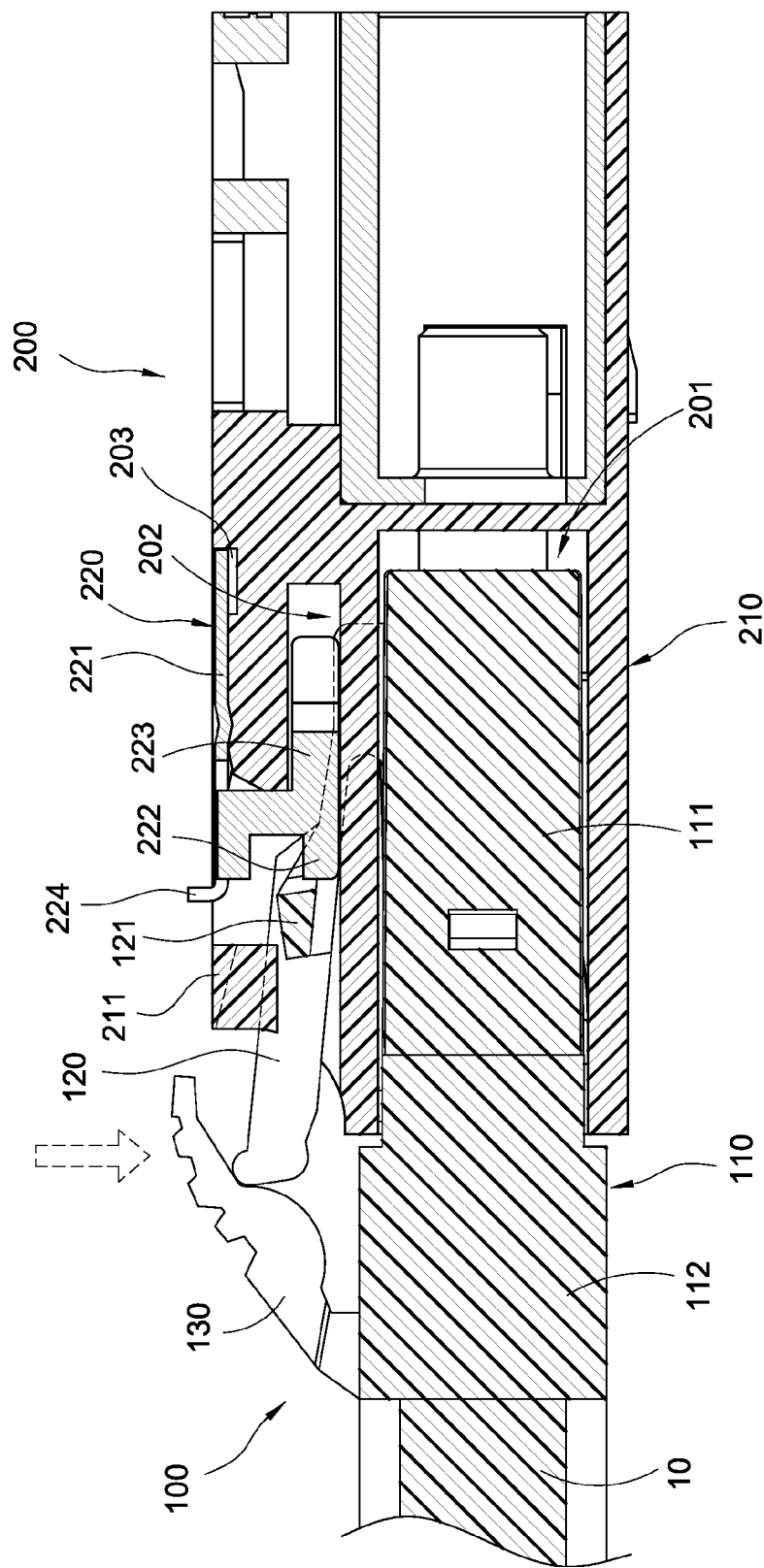
FIG. 4 is a sectional view of the optical fiber plug exiting from the optical fiber socket.
Figure 5:
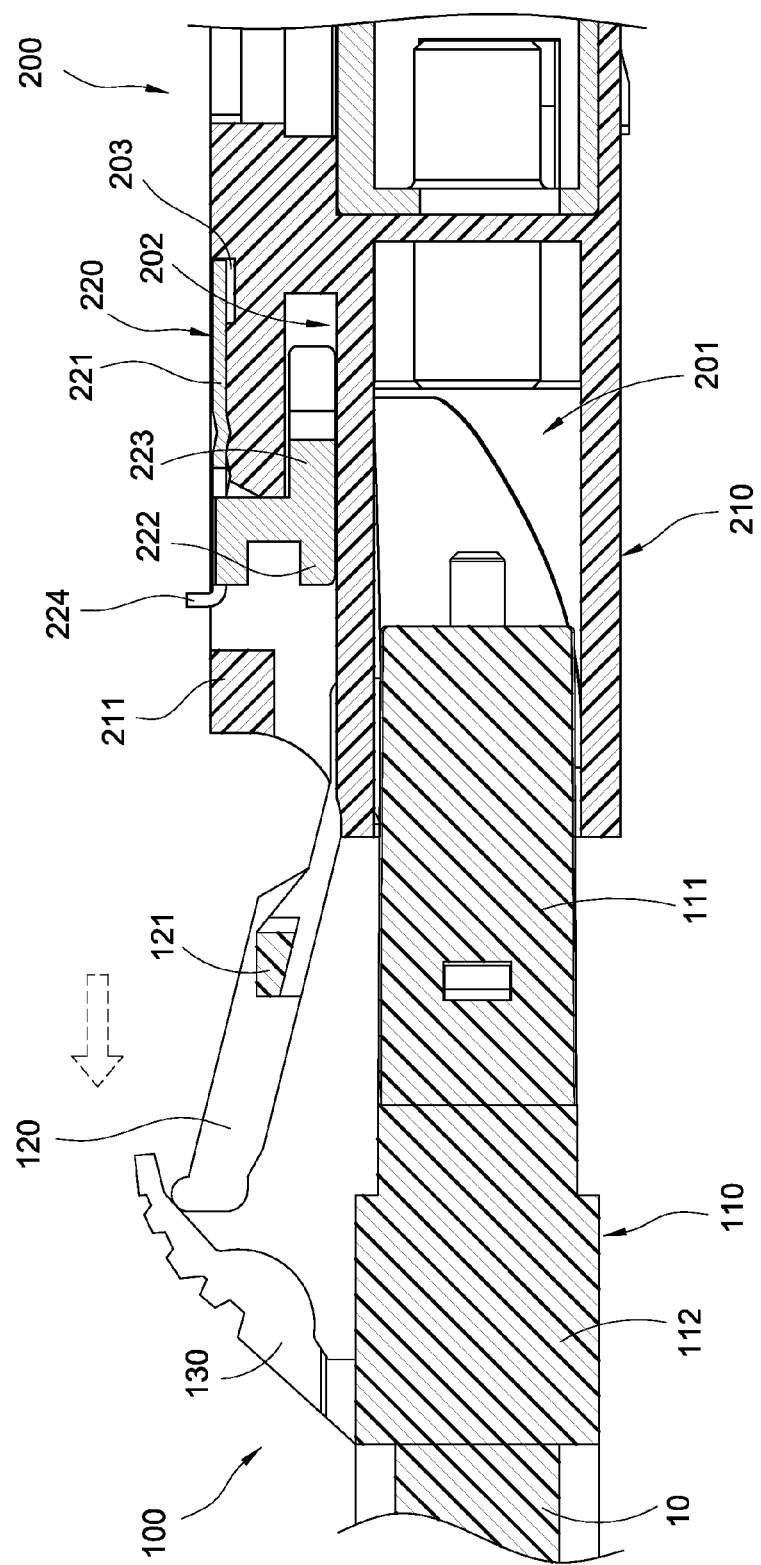
FIG. 5 is another sectional view of the optical fiber plug exiting from the optical fiber socket.

As shown in FIG. 4 and FIG. 5, when removing the optical fiber plug 100 from the optical fiber socket 200, it only needs to press the pressing elastic arm 130 which simultaneously presses the snap-fit elastic arm 120. The stop block 121, therefore, backs into the accommodating slot 202 to facilitate the plugging section 111 exiting from the plugging slot 201.

Figure 6:
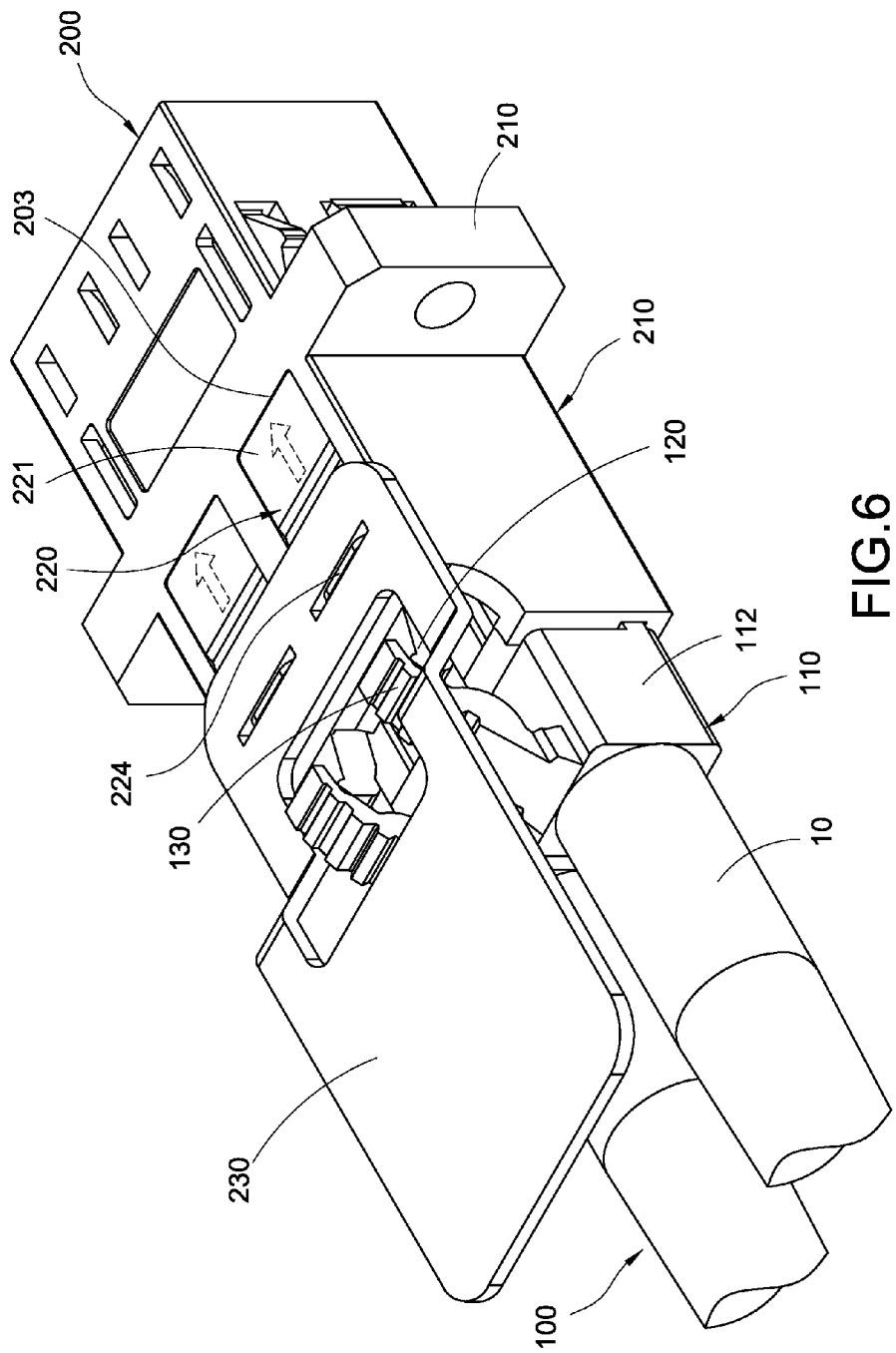
FIG. 6 is a schematic view of a connecting piece of the optical fiber socket according to the embodiment of the disclosure.

Referring to FIG. 6, the optical fiber socket 200 may further comprise a connecting plate 230. Each paddle 221 extends and forms a flange 224 for being connected to the connecting plate 230. Pulling the connecting plate 230 may push multiple paddles 221 at the same time.

In the optical fiber plug 100 and the optical fiber socket 200 of the disclosure, pressing the snap-fit elastic arm 120 can cause the stop block 121 thereon to move relative to the accommodating slot 202. This makes plugging and unplugging processes much easier. Furthermore, the stopper pin 212 stops between the stop wall 211 and the accommodating slot 202 so the optical fiber plug 100 is fixed stably, thereby improving its safety.

What is claimed is:

1. An optical fiber socket, comprising:
   a socket body having a plugging slot, wherein an edge of the plugging slot forms a stop wall and an accommodating slot is formed in the plugging slot near the stop wall; and
   a fastening member slidably disposed in the plugging slot, wherein the fastening member extends and forms a stopper pin, the stopper pin is configured for sliding along the accommodating slot and for being stopped between the stop wall and the accommodating slot,
   wherein the plugging slot is configured to receive an optical fiber plug protruded with a stop block, the stopper pin extends along an axial direction of the accommodating slot and is able to slide toward the optical fiber plug to be blocked between the stop block and the plugging slot, so as to fasten the optical fiber plug to the optical fiber socket.

2. The optical fiber socket according to claim 1, wherein a pair of accommodating slots is disposed on two sides of the stop wall, the fastening member extends and forms a pair of stopper pins corresponding to each of the accommodating slots, each of the stopper pins is configured for sliding along the accommodating slot and for being stopped between the stop wall and the accommodating slot.

3. The optical fiber socket according to claim 1, wherein the vertical direction of the accommodating slot and the vertical direction of the plugging slot are parallel to each other.

4. The optical fiber socket according to claim 1, wherein a lateral opening connecting the plugging slot is formed on the socket body, the fastening member has a paddle, the paddle is in and exposed by the lateral opening and is configured for sliding along the lateral opening.

5. The optical fiber socket according to claim 1, wherein the fastening member extends and forms a locating sheet, a locating block corresponding to the locating sheet is disposed on and protrudes from the plugging slot, the fastening member is configured for moving in order to make the locating sheet press the locating block.

6. The optical fiber socket according to claim 5, wherein when the locating sheet fixes the fastening member, the stopper pin exits from the place between the stop wall and the accommodating slot.

7. The optical fiber socket according to claim 5, wherein the locating block has a guide slope for guiding the locating sheet to cross the locating block and then to be pressed on the locating block.

8. The optical fiber socket according to claim 1, wherein the socket body has a plurality of plugging slots while a plurality of lateral openings connecting each of the plugging slots are formed on the socket body, the number of the fastening members is plural, each of the fastening members is disposed in the corresponding plugging slot, each of the fastening members has a paddle, each of the paddles is in and exposed by the corresponding lateral opening and is configured for sliding along the lateral opening.

9. The optical fiber socket according to claim 8, wherein each of the paddles extends and forms a flange.

10. The optical fiber socket according to claim 9, further comprising a connecting plate, wherein each of the flanges is connected to the connecting plate.

* * * * *